(12) United States Patent
Pulleti et al.

(10) Patent No.: US 9,282,466 B2
(45) Date of Patent: Mar. 8, 2016

(54) DEPLOYING A NETWORK OF NODES IN AN AREA OF INTEREST

(71) Applicant: Honeywell International Inc., Morristown, NJ (US)

(72) Inventors: Uday K. Pulleti, Machilipatnam (IN); Arun Vijayakumari Mahasenan, Trivandrum (IN)

(73) Assignee: Honeywell International Inc., Morristown, NJ (US)

( * ) Notice: Subject to any disclaimer, the term of this patent is extended or adjusted under 35 U.S.C. 154(b) by 353 days.

(21) Appl. No.: 13/873,951

(22) Filed: Apr. 30, 2013

(65) Prior Publication Data

US 2014/0321329 A1 Oct. 30, 2014

(51) Int. Cl.
 *H04W 16/18* (2009.01)
 *H04W 16/26* (2009.01)
 *H04W 16/20* (2009.01)

(52) U.S. Cl.
 CPC .............. *H04W 16/18* (2013.01); *H04W 16/20* (2013.01)

(58) Field of Classification Search
 None
 See application file for complete search history.

(56) References Cited

U.S. PATENT DOCUMENTS

| 5,463,673 | A | 10/1995 | Herscovici | |
|---|---|---|---|---|
| 2010/0026490 | A1* | 2/2010 | Butler et al. | 340/552 |
| 2014/0036787 | A1* | 2/2014 | Ganu et al. | 370/329 |
| 2014/0120945 | A1* | 5/2014 | Sharma et al. | 455/456.1 |

FOREIGN PATENT DOCUMENTS

WO 2004086783 10/2004

OTHER PUBLICATIONS

Intae Kang, et al. "Scalable power-efficient broadcast over densely deployed wireless ad hoc networks", Wireless Communications and Networking Conference, 2005 IEEE New Orleans, LA, USA Mar. 13-17, 2005, Piscataway, NJ, USA, IEEE, vol. 4, Mar. 13, 2005, pp. 2063-2068.
Srivathsan Srinivasagopalan, et al. "An Oblivious Spanning Tree for Single-Sink Buy-at-Bulk in Low Doubling-Dimension Graphs", IEEE Transactions on Computers, IEEE Service Center, Los Alamitos, CA, US, vol. 61, No. 5, May 1, 2012, pp. 700-712.
EP Search Report related to EP Application 14164775, dated Dec. 17, 2014 (4 pages).

* cited by examiner

*Primary Examiner* — Awet Haile
(74) *Attorney, Agent, or Firm* — Brooks, Cameron & Huebsch, PLLC (57) ABSTRACT

Systems, methods, and devices for deploying a network of nodes in an area of interest are described herein. For example, in one or more embodiments, the area of interest can be determined, a bounding box can be created for the area of interest, the bounding box can be filled with a node deployment grid, a determination of whether a node in the node deployment grid is an essential node or an enhancement node can be made, the enhancement node can be removed when it provides duplicate coverage to each portion of the area of interest that is provided coverage by the enhancement node, at least one of the essential node and the enhancement node can be connected to a node in the node deployment grid when they are disconnected from nodes in the node deployment grid with a minimum spanning tree.

20 Claims, 7 Drawing Sheets

DEPLOYING A NETWORK OF NODES IN AN AREA OF INTEREST

TECHNICAL FIELD

The present disclosure relates to deploying a network of nodes in an area of interest.

BACKGROUND

Nodes can be placed at various locations in a structure to form a network, which can distribute data and/or collect data. For example, a node can include a wireless router. During installation of nodes, a site survey engineer can visit a site and try to meet a requirement for the network through use of prior experience to guess a possible location for each node in the network. Upon installation, the site survey engineer can take measurements associated with the network of nodes to determine whether the requirement for the network has been met. If the requirement for the network has not been met, the site survey engineer can move the nodes in a trial and error method until the requirement for the network has been met.

DETAILED DESCRIPTION

A network of nodes can be installed by a site engineer. As used herein, a network of nodes can include one or more nodes. The site survey engineer can visit a site environment and use prior experience to guess possible locations where each node in the network of nodes should be installed. Upon installation of the network of nodes, the site survey engineer can determine whether the network of nodes have been placed in the correct locations to meet a requirement for the network.

However, using such a trial and error method can result in increased time and costs. For example, the site survey engineer may need to be trained and/or possess prior experience to guess the possible locations where each node in the network of nodes should be installed. Alternatively, and/or in addition, the trial and error process involved with installing the network of nodes, measuring network parameters to see if the requirement for the network is met, and then adjusting the placement of the network of nodes if the requirement is not met can be time consuming. For instance, the placement of the network may need to be adjusted multiple times if the measured network parameters indicate that the network requirements have not been met.

Alternatively, and/or in addition, the trial and error method can result in an over estimating and/or under estimating of the number of nodes. For example, when the number of nodes is over estimated, additional nodes above the number of nodes required to meet requisite network requirements can be installed. As such, excess costs can be associated with the cost of each additional node and the cost of installing each additional node. In an example where the number of nodes is under estimated, excess costs can be associated with time spent by the site survey engineer trying to adjust a location of the nodes to meet the network requirements. However, because the number of nodes is underestimated, minimum network requirements may not be met because not enough nodes exist to meet the network requirements.

Alternatively, and/or in addition, the job of the site survey engineer can be complicated as a result of the site environment having an area of interest with irregular boundaries. For instance, it may be difficult to establish a pattern in which the network of nodes can be deployed without over estimating and/or under estimating the number of nodes to deploy.

Alternatively, and/or in addition, the job of the site survey engineer can be complicated by having to ensure that the installed network of nodes in the site environment provide connectivity and coverage for the area of interest. In an example, connectivity can be defined as an ability of nodes in the network of nodes to communicate with one another. For instance, two nodes can possess connectivity when the nodes are within range of a broadcast produced by each respective node. In an example, an area that possesses coverage can be defined as an area that has a signal broadcast to every portion of the area by at least one node.

In an example, industrial plants can have mobile wireless nodes that can roam throughout the area of the plant and need wireless connectivity irrespective of their position. These wireless nodes can require that they communicate with a central server in the plant. In such situations, there can be a need for deploying a number of nodes so that the whole plant area, which may have an irregular shape, is in the wireless coverage range of these nodes and also the nodes should be able to form a mesh network to relay the information from the mobile wireless nodes to the central server.

The nodes can be costly devices and so only a minimum number of these devices should be deployed in the plant. To solve this problem, an algorithm can compute the minimum number of nodes required to provide coverage in the desired area of interest and at the same time enable mesh connectivity among the nodes. Along with computing the minimum number of the nodes required, the algorithm can determine the location where these nodes can be placed.

To help address the limitations associated with the trial and error method of installing a network of nodes, systems, methods, and machine-readable and executable instructions are provided for deploying a network of nodes in an area of interest. Deploying can include determining the area of interest for node deployment. Deploying can include creating a bounding box for the area of interest. Deploying can include filling the bounding box with a node deployment grid. Deploying can include determining whether a node in the node deployment grid is an essential node or an enhancement node. Deploying can include removing the enhancement node when it provides duplicate coverage to a portion of the area of interest. Deploying can include connecting at least one of the essential node and the enhancement node to a node in the node deployment grid when they are disconnected from nodes in the node deployment grid with a minimum spanning tree.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1A, and a similar element may be referenced as 102 in FIG. 1D.

As will be appreciated, elements shown in the various embodiments herein can be added, exchanged, and/or eliminated so as to provide a number of additional embodiments of the present disclosure. As used herein, "a" or "a number of" refers to one or more. In addition, as will be appreciated, the proportion and the relative scale of the elements provided in the figures are intended to illustrate the embodiments of the present invention, and should not be taken in a limiting sense.

Figure 1A:
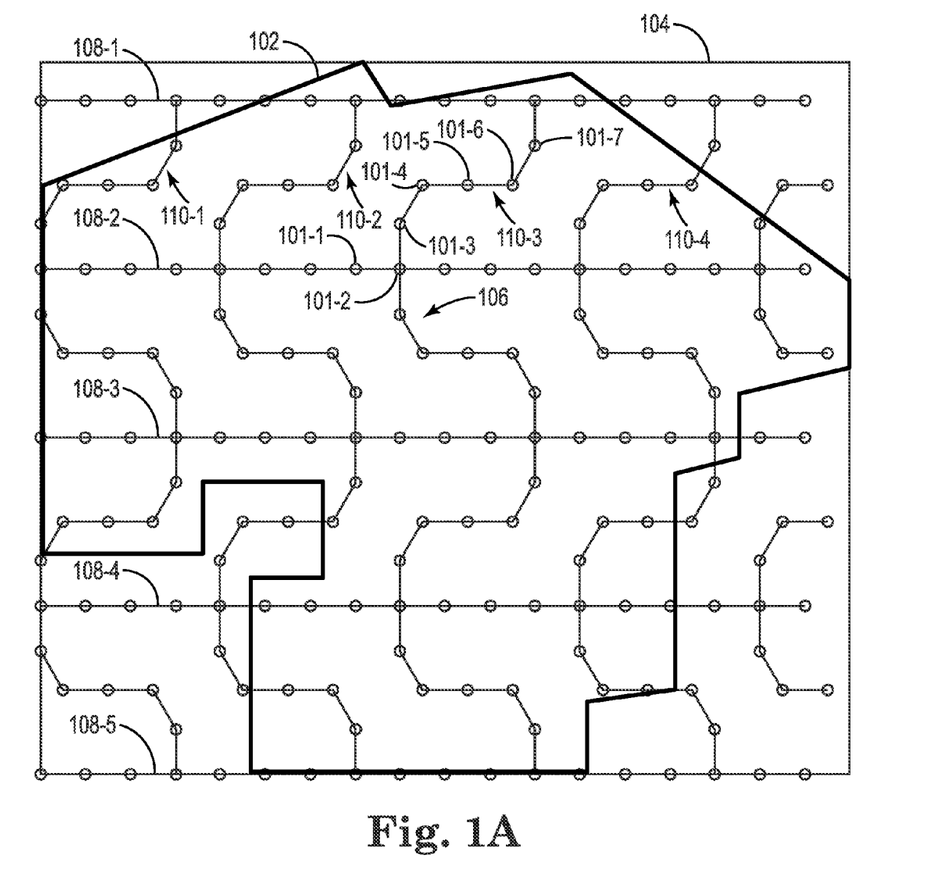
FIG. 1A illustrates a system for deploying a network of nodes in an area of interest according to one or more embodiments of the present disclosure.

FIG. 1A illustrates a system for deploying a network of nodes in an area of interest according to one or more embodiments of the present disclosure. In an example, an area of interest 102 for node 101-1, 101-2, . . . 101-7 deployment can be defined as an area in which placement of nodes 101-1, 101-2, . . . 101-7 is desired to provide coverage and connectivity to the area. Nodes 101-1, 101-2, . . . 101-7 are hereinafter collectively referred to as nodes 101 and are represented by circles in FIG. 1. For instance, the area of interest can be defined by a boundary of a plant in which nodes 101 are deployed to provide a wireless network that provides coverage over the entire area of the plant and also connectivity respective to each of the nodes 101 that are deployed.

As such, the boundary of the plant can be an irregular boundary, as shown in FIG. 1A. For example, portions of the boundary may not be parallel to one another. As such, it may be difficult to place nodes 101 within the boundary to provide a connectivity and coverage to the area of interest enclosed by the boundary while using a minimum number of nodes 101.

In an example, some embodiments provide a Minimum Node Connected Coverage (MNCC) algorithm, which can provide for coverage of the area of interest and connectivity by providing one path between any pair of nodes 101. Alternatively, and/or in addition, some embodiments provide a Robust Connected Coverage (RCC) algorithm, which can provide coverage of the area of interest and one path between any pair of nodes 101. In an example, the RCC algorithm can achieve redundancy of more than one path between any pair of nodes 101 and can achieve redundancy in coverage.

The MNCC and RCC algorithm can provide coverage to the area of interest with an increased efficiency. For instance, a theoretical lower limit of the smallest number of nodes utilized to provide connectivity and coverage to the area of interest can be calculated. In an example, the efficiency of the MNCC and RCC algorithm can be calculated by dividing the theoretical lower limit of the smallest number of nodes required to provide connectivity and coverage to the area of interest by the number of nodes calculated by the MNCC and RCC algorithm. In an example, the MNCC algorithm can provide coverage and connectivity to the area of interest with an efficiency of 0.86 and the RCC algorithm can provide coverage and connectivity to the area of interest with an efficiency of 0.71.

In an example, the MNCC and the RCC algorithms can be executed to form a node deployment grid 106, which can be defined as a framework for deployment of the nodes 101 in the area of interest. In an example, the area of interest 102 for node 101 deployment with an irregular boundary can be determined. For instance, a blueprint of the area of interest 102 can be analyzed by a computing device and the boundary of the area of interest 102 can be extracted.

In an example, a digital file that includes the blueprint can be used and/or a digital picture of the blueprint can be taken and analyzed by the computing device to determine the area of interest 102. Alternatively, and/or in addition, a user can create a drawing of the area of interest 102 using the computing device. For instance, the user can create a boundary of the area of interest 102 and/or add objects to the area of interest 102 (e.g., columns, walls, landscaping features, equipment, etc.) via a user interface of the computing device.

In an example, a bounding box 104 can be created for the area of interest 102. In an example, the bounding box 104 can enclose the area of interest 102 with a rectangle that is of a minimum area. For instance, the bounding box 104 can be a minimum area bounding box 104 that encompasses the whole area of the area of interest 102 with the irregular boundary and also occupies a minimum area.

In an example, the bounding box 104 for the area of interest can be filled with a node deployment grid 106. The node deployment grid 106 can be produced via the MNCC algorithm, as shown in FIG. 1A. In an example, the node deployment grid 106 can include row structures 108-1, 108-2, 108-3, 108-4, 108-5, hereinafter collectively referred to as row structures 108. The row structures 108 can be placed on equally oriented axes. For example, the axes on which the row structures 108 are placed may be parallel and/or within a defined range of parallel (e.g., intersecting). Nodes 101-1, 101-2 can be placed on the row structures 108 within a defined distance of one another.

In an example, the defined distance at which the nodes 101-1, 101-2 are placed from one another on the row structures 108 can be a distance that is less than and/or equal to a range of a signal that is broadcast from each of the nodes 101-1, 101-2. In an example, the nodes 101-1, 101-2 can be placed within a distance from one another such that the nodes 101-1, 101-2 are connected. For instance, a pair of neighboring nodes 101-1, 101-2 can receive the signal that is broadcast from each of the nodes 101-1, 101-2.

In some embodiments, the equally oriented row structures 108 can have nodes placed between the equally oriented row structures 108. In an example, the nodes 101-3, 101-4, 101-5, 101-6, 101-7 between the equally oriented row structures 108 can be connected by a z-connector axis 110-1, 110-2, 110-3, 110-4. For instance, equally oriented row structure 108-1 can be connected to equally oriented row structure 108-2 via the z-connector axis 110-1, 110-2, 110-3, 110-4.

In an example, the nodes 101-3, 101-4, 101-5, 101-6, 101-7 on the z-connector axis 110-1, 110-2, 110-3, 110-4 can be placed within a distance from one another such that the nodes 101-3, 101-4, 101-5, 101-6, 101-7 are connected. For instance, a pair of neighboring nodes 101-3, 101-4 can receive the signal that is broadcast from each of the neighboring nodes 101-3, 101-4. In an example, FIG. 1A demonstrates the connectivity between the nodes 101.

Figure 1B:
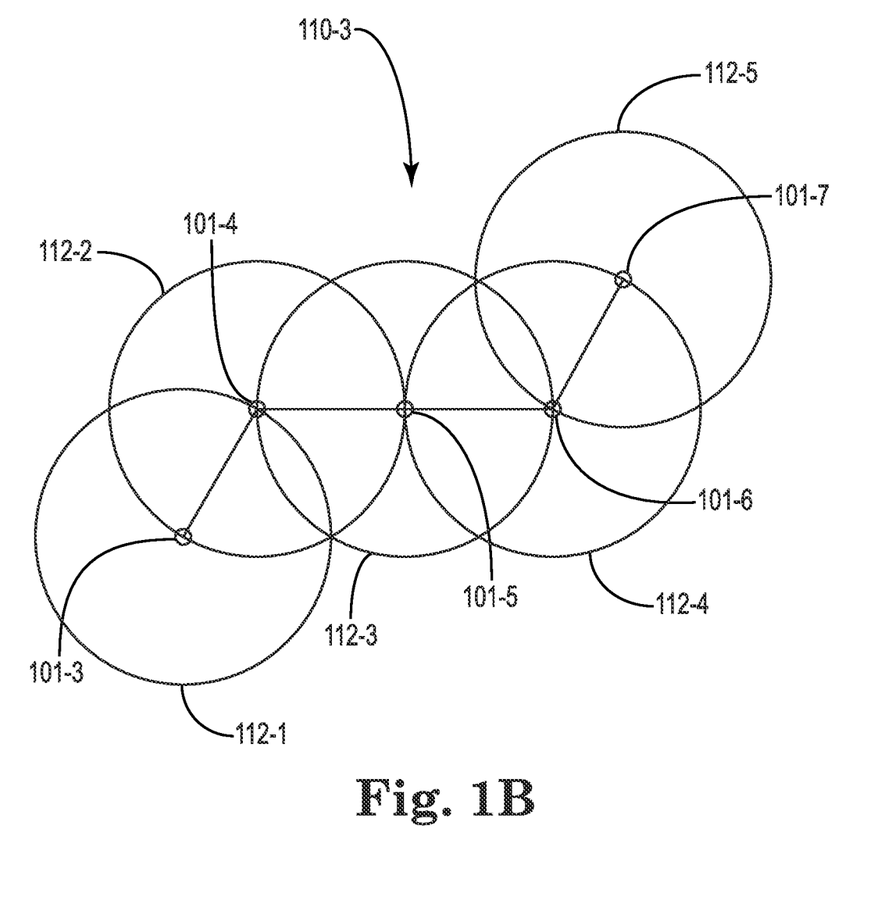
FIG. 1B illustrates a z-connector axis according to one or more embodiments of the present disclosure.

FIG. 1B illustrates a z-connector axis according to one or more embodiments of the present disclosure. The z-connector axis 110-3 can include a first number of nodes (e.g., 101-3, 101-4) forming a first axis, a second number of nodes (e.g., 101-4, 101-5, 101-6) forming a second axis, and a third number of nodes (e.g., 101-6, 101-7) forming a third axis. The nodes in FIG. 1B are represented by the small circles.

In an example, the first axis can extend off of a first side of the second axis and the third axis can extend off of a second side of the second axis. The first side of the second axis and the second side of the second axis can oppose one another. In an example, the first axis can form an obtuse angle between the first side of the second axis and the first axis and the third axis can form an obtuse angle between the second side of the second axis and the third axis.

In an example, the nodes 101-3, 101-4, 101-5, 101-6, 101-7 can broadcast a signal within a range 112-1, 112-2, 112-3, 112-4, 112-5 of the node, represented by the large circles, respectively. As shown in FIG. 1B, the nodes 101-3, 101-4, 101-5, 101-6, 101-7 are within range of one another. For instance, node 101-3 is within range 112-2 of node 101-4; node 101-4 is within range 112-1 of node 101-3 and range 112-3 of node 101-5; node 101-5 is within range 112-2 of node 101-4 and within range 112-4 of node 101-6; node 101-6 is within range 112-3 of node 101-5 and within range 112-5 of node 101-7; and node 101-7 is within range 112-4 of node 101-6. As such, the nodes 101-3, 101-4, 101-5, 101-6, 101-7 are connected to one another and can route information from one node to the next wirelessly.

Figure 1C:
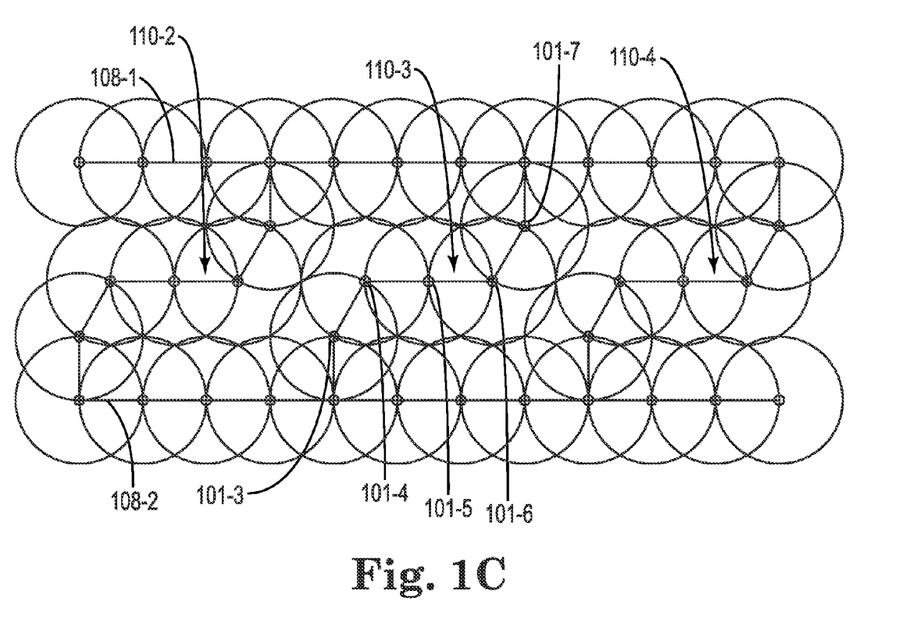
FIG. 1C illustrates a connectivity and coverage diagram according to one or more embodiments of the present disclosure.

FIG. 1C illustrates a connectivity and coverage diagram according to one or more embodiments of the present disclosure. In an example, the z-connectors 110-2, 110-3, 110-4 are shown providing a connection between row structures 108-1, 108-2 via nodes 101-3, 101-4, 101-5, 101-6, and 101-7 as well as the nodes associated with z-connectors 110-2, 110-4. As shown, nearly every node along row structures 108-1, 108-2 and every node along z-connectors 110-2, 110-3, 110-4 is provided dual connectivity and the area of interest covered by the nodes is provided coverage at any point in the area of interest.

In an example, when the MNCC algorithm is used to produce the node deployment grid, almost every node 101-3, 101-4, 101-5, 101-6, 101-7 in the node deployment grid is provided with dual connectivity. For instance, while nodes 101-3, 101-4, 101-5, 101-6, 101-7 along a perimeter of the node deployment grid may be connected to one other node 101-3, 101-4, 101-5, 101-6, 101-7, most nodes 101-3, 101-4, 101-5, 101-6, 101-7 can be connected to at least two other nodes.

As such, information can be routed through the nodes 101-3, 101-4, 101-5, 101-6, 101-7 to a central server via multiple routes. In an example, a routing load can be distributed through the network of nodes 101-3, 101-4, 101-5, 101-6, 101-7 by eliminating critical nodes. For instance, the routing load does not have to be directed through one particular node, which can cause a failure of the network if the particular node malfunctions.

Figure 1D:
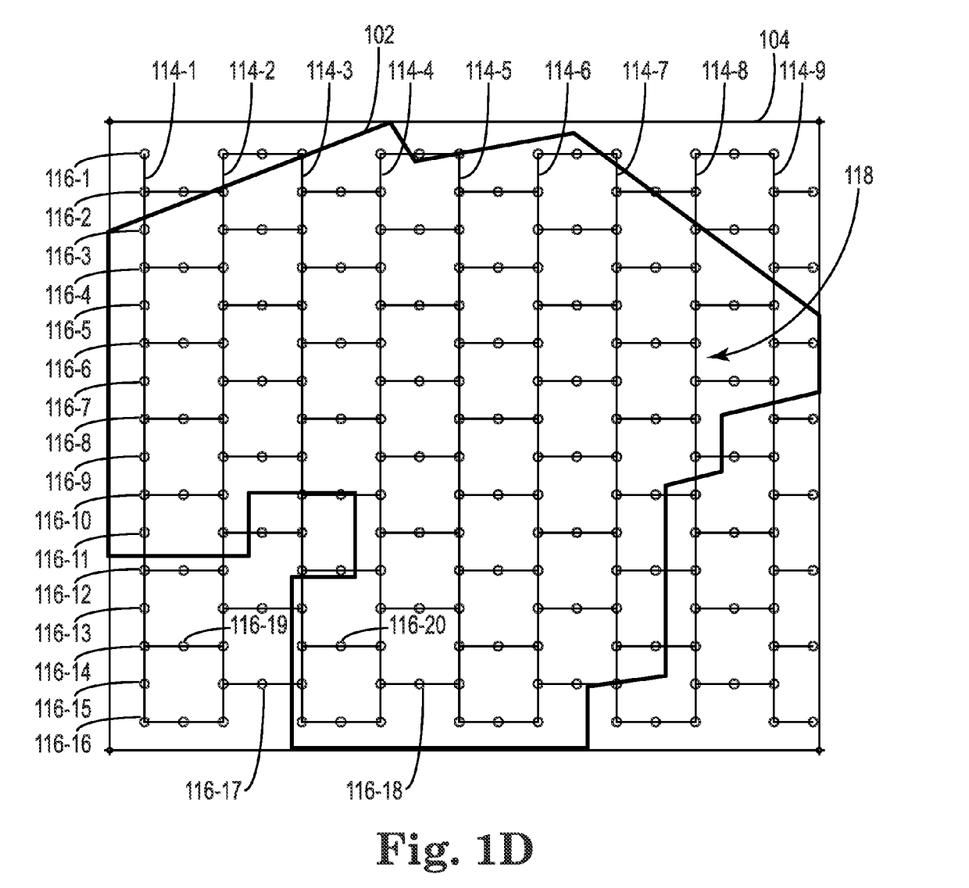
FIG. 1D illustrates a system for deploying a network of nodes in an area of interest according to one or more embodiments of the present disclosure.

FIG. 1D illustrates a system for deploying a network of nodes in an area of interest according to one or more embodiments of the present disclosure. Alternatively, and/or in addition to the equally oriented row structures being connected by a z-connector axis, the node deployment grid 118 can include a shifted rectangular grid for placement of nodes 116-1, 116-2, ... 116-20, generally referred to hereinafter as nodes 116, as shown in FIG. 10. The shifted rectangular grid can cover the area of interest 102 and can be confined by the bounding box 104.

The shifted rectangular grid can be produced by the RCC algorithm and can include equally oriented row structures 114-1, 114-2, ... 114-9. In an example, the axes of the equally oriented row structures can be formed by a number of nodes. For instance, a first equally oriented row structure 114-1 can include nodes 116-1, 116-2, ... 116-16 represented as small circles.

The equally oriented row structures 114-1, 114-2, ... 114-9 can be connected by shifted connector axes. In an example, the equally oriented row structures 114-1, 114-2, 114-3, 114-4, 114-5 can be connected with a first connector axis formed by a number of nodes 116-17, 116-18. The number of nodes 116-17, 116-18 can be placed between every other row structure. For instance, a first node 116-17 can be placed between a second equally oriented row structure 114-2 and a third equally oriented row structure 114-3 and a second node 116-18 can be placed between a fourth equally oriented row structure 114-4 and a fifth equally oriented row structure 114-5. The first node 116-17 and the second node 116-18 can be on a first connector axis.

In addition, a third node 116-19 can be placed between a first equally oriented row structure 114-1 and a second equally oriented row structure 114-2 and a fourth node 116-20 can be placed between a third equally oriented row structure 114-3 and a fourth equally oriented row structure 114-4. The third node 116-9 and the fourth node 116-20 can be on a second connector axis.

In an example, the second connector axis can be equally oriented to the first connector axis, but can be shifted, as shown in FIG. 1D. As a result of how the nodes 116 are positioned on the node deployment grid 118 using the RCC algorithm, the nodes 116 in the node deployment grid will have dual connectivity and most of the nodes in the node deployment grid 118 will have triple connectivity. For instance, nodes 116-3, 116-5, 116-7, 116-9, 116-11, 116-13, 116-15, 116-16, 116-17, 116-18, 116-19, and 116-20 will all have dual connectivity and nodes 116-2, 116-4, 116-6, 116-8, 116-10, 116-12, 116-14 will all have triple connectivity.

In a manner analogous to that discussed in relation to FIG. 1C, information can be routed through the nodes 116 to a central server via multiple routes. In an example, a routing load can be distributed through the network of nodes 116 by eliminating critical nodes. For instance, the routing load does not have to be directed through one particular node 116, which can cause a failure of the network if the particular node 116 malfunctions.

Figure 1E:
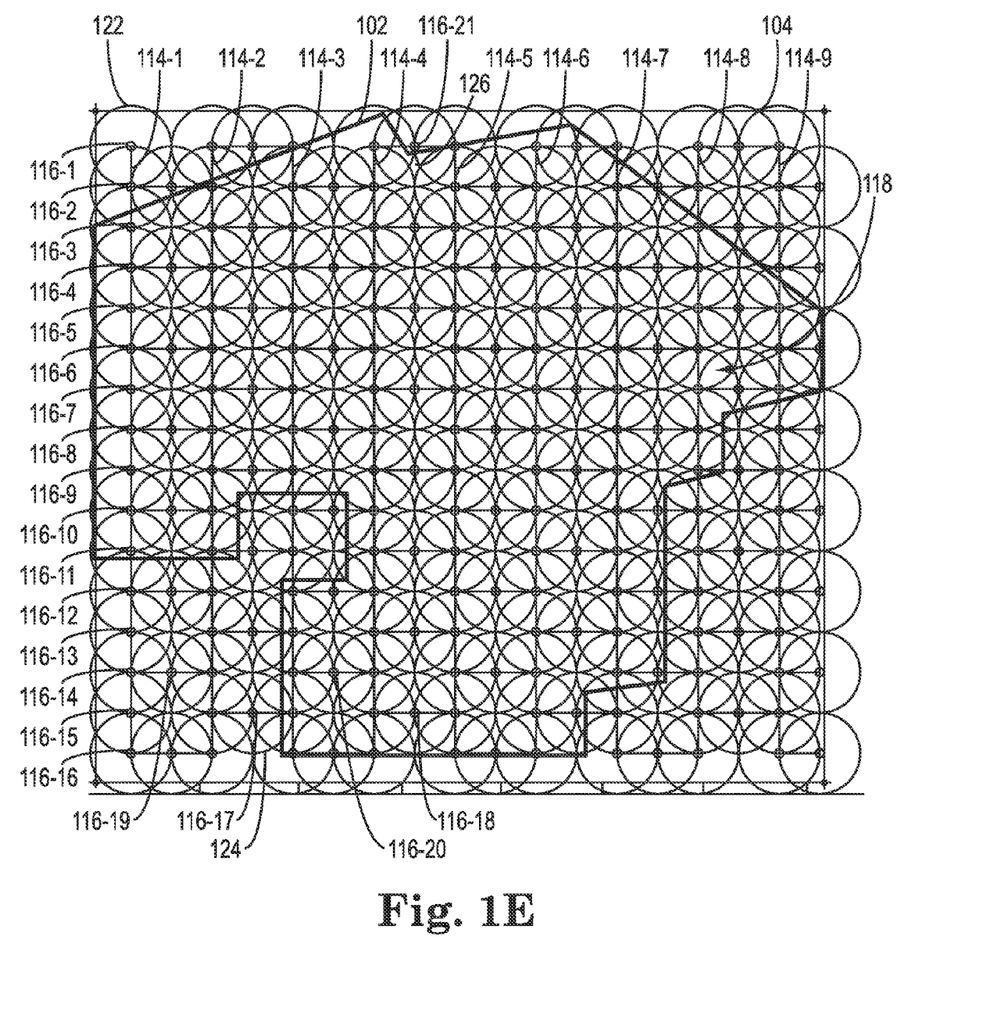
FIG. 1E illustrates a connectivity and coverage diagram according to one or more embodiments of the present disclosure.

FIG. 1E illustrates a connectivity and coverage diagram according to one or more embodiments of the present disclosure. In an example, the nodes 116-1, 116-2, ... 116-16 along a first equally oriented row structure 114-1 can be connected to nodes along a second equally oriented row structure 114-2, a third equally oriented row structure 114-3, a fourth equally oriented row structure 114-4, a fifth equally oriented row structure 114-5, etc., by a first connector axis formed by a number of nodes 116-17, 116-18 and a second connector axis formed by a number of nodes 116-19, 116-20.

In an example, the nodes, represented by small circles, can broadcast a signal within a range, as discussed in relation to FIG. 1B. The broadcast range of the node can be represented by the circles surrounding each node in FIG. 1E. For example, in a particular example, range 122 of a broadcast of node 116-1 can be represented by the circle that surrounds node 116-1. As shown in FIG. 1E, all nodes in the area of interest 102 are within range of at least two nodes and will have double connectivity and most of the nodes within the area of interest 102 will be within the range of at least three nodes and have triple connectivity. Alternatively, and/or in addition, the area of interest 102 covered by the nodes is provided coverage at any point in the area of interest 102.

In some embodiments, a determination can be made whether a node in the node deployment grid is an essential node or an enhancement node. In an example, the determination can be made based on a determined location of the node. As such, the location of the node can be determined. For instance, an essential node can be a node located within a boundary of the area of interest 102. An example of an essential node can be node 116-20 because the node 116-20 is located within the boundary of the area of interest 102 and provides coverage and connectivity for the area of interest 102.

An enhancement node can be a node located outside of the boundary of the area of interest 102, but provides coverage to a portion of the area of interest 102. An example of an enhancement node can be node 116-17 because the node 116-17 is located outside the boundary of the area of interest 102, but the range of a broadcast of the node 116-17, represented by circle 124 extends into the area of interest 102.

In some embodiments, a search can be performed for any enhancement nodes to determine whether a portion of the area of interest is provided coverage by only the enhancement node. If a node is determined to be an enhancement node, an indication can be stored that indicates such.

If a portion of the area of interest is provided coverage by only the enhancement node, a position of the enhancement node can be determined for maximum coverage of the area of interest 102. In an example, a position of the enhancement node can be moved such that a position of the enhancement node is within a boundary of the area of interest 102.

For instance, a portion 126 of the area of interest is only provided coverage by the node 116-21, which is located outside of the boundary of the area of interest 102. As such, the position of the node 116-21 can be moved to within the boundary of the area of interest 102 so the portion 126 that is only provided coverage by the node 116-21 is ensured coverage.

In some embodiments, if the enhancement node provides duplicate coverage to each portion of the area of interest 102 that is provided coverage by the enhancement node, the enhancement node can be removed. For instance, the node 116-17 provides duplicate coverage to each portion of the area of interest 102 that is provided coverage by the node 116-7 and can thus be removed.

In some embodiments, at least one of a horizontal and vertical distance between a number of nodes in the node deployment grid can be decreased. In an example, nodes along a border of the boundary of the area of interest 102 can provide coverage to areas outside of the area of interest 102. However, coverage may only be desired within the area of interest 102, resulting in a loss of coverage efficiency and/or connectivity efficiency.

As such, the distance between the number of nodes in the deployment grid can be decreased in a horizontal and/or vertical direction to reduce an amount by which nodes provide coverage to areas outside the area of interest 102. In an example, nodes can be moved away from a border of the area of interest toward the center of the area of interest. For instance, the distance between the number of nodes can be decreased in a horizontal and vertical direction until coverage provided outside the area of interest by the nodes is minimized, but full coverage is still maintained within the area of interest 102.

In some embodiments, at least one of the essential node and the enhancement node can be connected to a node in the node deployment grid with a minimum spanning tree when they are disconnected from nodes in the deployment grid. In an example, the minimum spanning tree can be computed for the nodes in the node deployment grid to determine if there are any disconnected nodes in the node deployment grid.

In an example, the nodes in the area of interest 102 can be represented as vertices on the minimum spanning tree. The vertices can be connected via a set of branches, in an example. The minimum spanning tree can determine the set of branches such that all of the vertices are connected by the branches and a total weight associated with the branches is a minimum.

In an example, the weight associated with each branch can be associated with a measure of bandwidth, latency, and/or congestion between the nodes that are connected by the branch, although examples are not so limited. As such, if an option exists to connect a first node to a second node or third node and a connection between the first and second node has a lower weight than a connection between the first and third node, it may be desirable to establish a connection between the first and second node. This may be desirable because the connection between the first and second node has a lower weight and thus may have a greater bandwidth, less latency, and/or less congestion associated with the connection.

Alternatively, and/or in addition, the weight of each branch can be associated with a distance between two nodes. In an example, a branch existing between two nodes that has a lesser weight can indicate that the nodes are closer to one another than a branch existing between two nodes that have a greater weight, which can indicate that the two nodes are further from one another.

In some embodiments, the weight for each branch connecting each vertex can be determined. For instance, bandwidth, latency, congestion, and/or range between nodes can be used to determine the weight for each branch connecting each vertex.

In an example, range can be used to determine the weight of each branch using the equation:

$$\text{Weight} = [\text{Euclidian distance/range}] - 1$$

where weight is the weight of the branch between two nodes, Euclidian distance is a linear distance between the two nodes, and range is a distance that a signal is broadcast from the nodes. In an example, the weight can be indicative of whether the nodes are connected. For instance, if the linear distance between two nodes is greater than a range of a signal broadcast from the nodes, the nodes may not be connected. As such, the range used in calculating the weight can be a lesser of the range of a signal broadcast from two nodes for which the weight is being determined.

In an example, for two nodes to be connected to one another, they should both be within range of each respective signal broadcast from each node. As such, the lesser of the range of the signal broadcast from the two nodes can be used for determining the weight of the branch between the two nodes. If the Euclidian distance between the two nodes is less than or equal to the range between the two nodes, a weight of zero can be assigned to the branch connecting the two nodes, which indicates that the nodes are connected.

In some embodiments, an additional node is placed along each branch with a minimum weight to ensure connectivity. When placing additional nodes, branches with a weight of zero are not considered. For instance, only branches with a weight greater than zero are considered for placement of a node along the branch, since branches with a weight of zero are already connected.

In an example, if a branch between a first node and a second node has a weight of 8 and a branch between the first node and a third node has a weight of 10, a number of nodes can be placed between the first node and the second node to provide a connection between the first node and the second node. As a result, a connectivity between nodes in the node deployment grid can be assured through addition of any nodes needed to provide a connection between nodes that are unconnected from other nodes in the node deployment grid.

Figure 2:
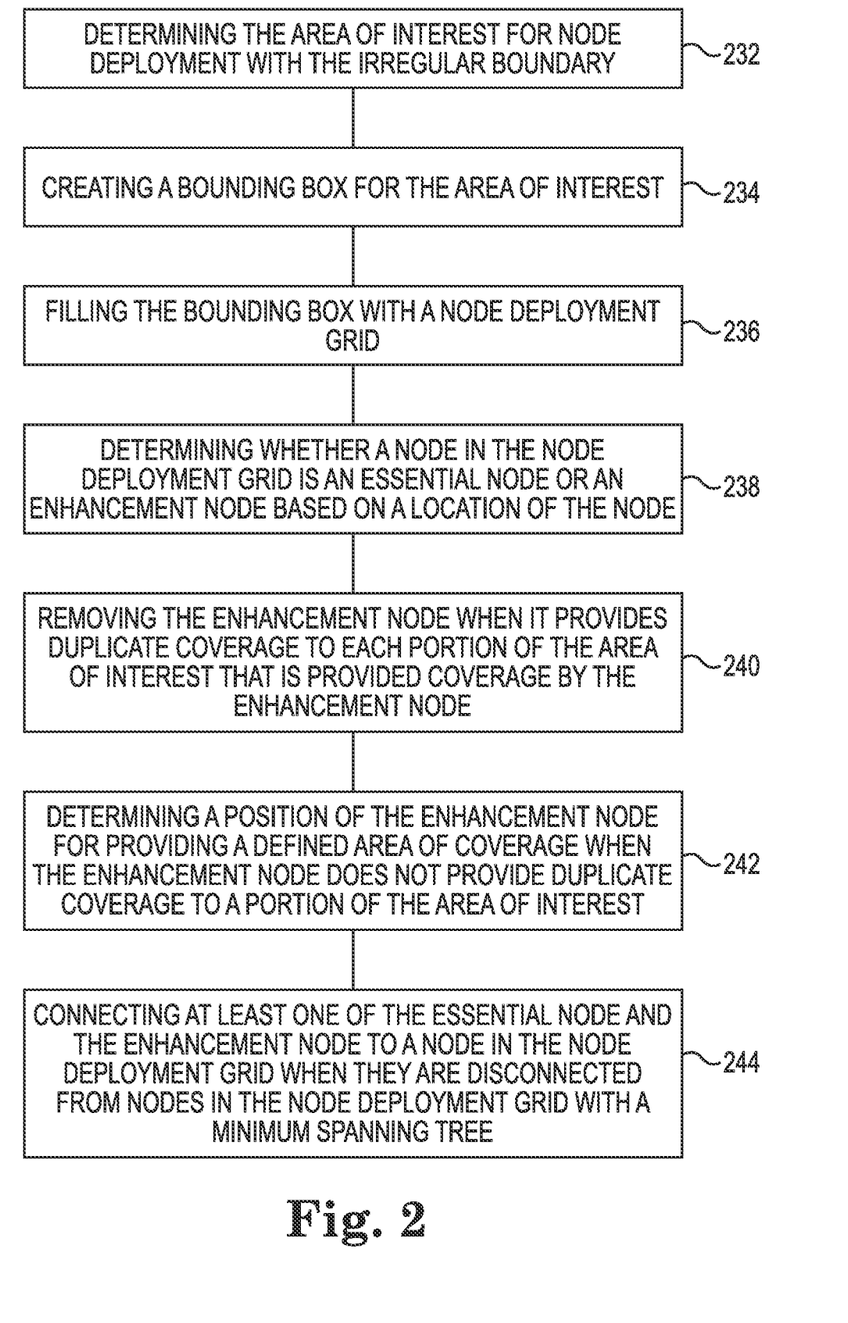
FIG. 2 illustrates a method for deploying a network of nodes in an area of interest according to one or more embodiments of the present disclosure.

FIG. 2 illustrates a method for deploying a network of nodes in an area of interest according to one or more embodiments of the present disclosure. In some embodiments, the method can include determining the area of interest for node deployment with an irregular boundary, at box 232. In an example, coordinates of the area of interest can be determined and used to create a boundary for the area of interest.

In some embodiments, the method can include, at box 234, creating a bounding box for the area of interest. In an example, the bounding box can enclose the area of interest with a rectangle that is of a minimum area.

In some embodiments, at block 236, the method can include filling the bounding box with a node deployment grid. As discussed herein, the node deployment grid can be produced via an MNCC algorithm and/or an RCC algorithm. The MNCC algorithm can provide coverage to the area of interest and one path between any pair of nodes within the node deployment grid. The RCC algorithm can provide coverage to the area of interest and one path between any pair of nodes, but can also achieve redundancy of more than one path between any pair of nodes with a high probability. Alternatively, and/or in addition, the RCC algorithm can achieve redundancy in coverage with a high probability. In an example, the redundancy can be achieved; however, an efficiency associated with how many nodes are used can be reduced by an amount.

In some embodiments, the method can include decreasing at least one of a horizontal and vertical distance between a number of nodes in the node deployment grid. As discussed herein, the distance between the number of nodes in the deployment grid can be decreased in a horizontal and/or vertical direction to reduce an amount by which nodes provide coverage to areas outside the area of interest. In an example, nodes can be moved away from a border of the area of interest toward the center of the area of interest. For instance, the distance between the number of nodes can be decreased in a horizontal and vertical direction until coverage provided outside the area of interest by the nodes is minimized, but full coverage is still maintained with the area of interest 102.

In an example, the distance between the number of nodes can be selectively decreased in at least one of the horizontal and vertical direction until coverage provided outside the area of interest by the nodes is minimized, but full coverage is still maintained within the area of interest 102. For instance, the distance between the number of nodes may only need to be decreased in one direction until coverage provided outside the area of interest by the nodes is minimized.

In some embodiments, the method can include, at block 238, determining whether a node in the node deployment grid is an essential node or an enhancement node based on a location of the node. As discussed herein, the essential node can be a node that is located within a boundary of the area of interest and provides coverage to the area of interest and/or a portion outside of the area of interest. The enhancement node can be a node that is located outside of the area of interest and provides coverage to a portion of the area of interest.

As discussed herein, the location of the node can be used to determine whether the node in the node deployment grid is an essential node or an enhancement node. For instance, if the node is located within a boundary of the area of interest, the node can be classified as an essential node. Alternatively, and/or in addition, if the node is located outside of the boundary of the area of interest, the node can be classified as an enhancement node.

In some embodiments, the method can include removing the enhancement node when it provides duplicate coverage to each portion of the area of interest that is provided coverage by the enhancement node, at block 240. For example, if each portion of the area of interest is provided coverage by another node (e.g., essential node), the enhancement node may not be necessary for providing coverage and can be removed to increase an efficiency associated with how many nodes are required to provide coverage to the area of interest.

In some embodiments, the method can include determining a position of the enhancement node for providing a defined area of coverage when the enhancement node does not provide duplicate coverage to a portion of the area of interest, at block 242. In an example, a portion of the area of interest may not be provided coverage by essential nodes, but may be provided coverage by one or more enhancement nodes. However, the enhancement nodes are positioned outside of the boundary of the area of interest, and as such may not be used.

Accordingly, in some embodiments, the method can include positioning the enhancement node inside of the area of interest to provide coverage to a portion of the area of interest. In an example, the defined area of coverage may be the portion located within the area of interest that is not provided coverage.

In some embodiments, at block 244, the method can include connecting at least one of the essential node and the enhancement node to a node in the node deployment grid when they are disconnected from nodes in the node deployment grid with a minimum spanning tree. In an example, the nodes can be represented as vertices on the minimum spanning tree and connections between the nodes can be represented with branches. In an example, the minimum spanning tree can find a set of branches that ensure that all of the nodes are connected with branches. Alternatively, and/or in addition, the minimum spanning tree can ensure that a total weight of the branches that connect each of the nodes is a minimum.

In an example, by ensuring that a total weight of the branches that connect each of the nodes is a minimum, an efficiency of the network can increase in terms of an effort required for the nodes to communicate with one another. For instance, as discussed herein, increased weight associated with branches can be associated with an increase in bandwidth, latency, congestion, and/or range between nodes, which may result in an unreliable and/or slow connection between the nodes. Alternatively, a decreased weight associated with branches can be associated with a decrease in bandwidth, latency, congestion, and/or range between nodes, which may result in a more reliable and/or faster connection between the nodes.

In an example, a weight of a branch that connects the at least one of the essential node and the enhancement node to the node in the node deployment grid can have a minimum determined weight. For instance, where a first branch connects a first node to a second node and a second branch connects the first node to a third node and the first branch has a lesser weight than the second branch, the first branch can be selected. As such, a more reliable and/or faster connection can be created with the first branch and/or less nodes can be used to create the connection.

In some embodiments, as discussed herein, the weight of the branch can be calculated by calculating a division product that includes dividing the distance between the at least one of the essential node and the enhancement node by a range of each node and subtracting the division product by one. As such, when the distance between nodes is less than or equal to the range of a signal produced by each node, a weight of zero can be assigned to the branch between the nodes.

In an example, a weight of zero between two nodes is indicative that the two nodes are connected. Alternatively, a weight that is greater than zero is indicative that the two nodes are not connected. As such, for each node that is unconnected, a branch that connects the node to another node that has a minimum weight is used to connect the node. In an example, additional nodes can be placed along the branch to connect the node.

Figure 3:
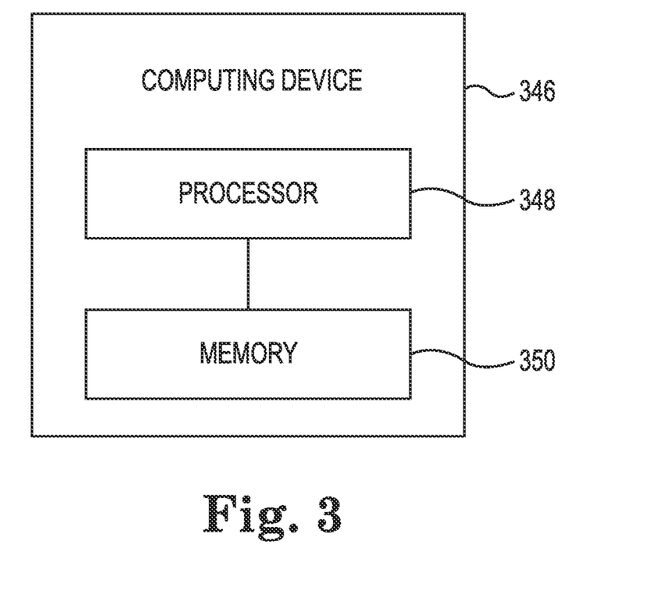
FIG. 3 illustrates a computing device for deploying a network of nodes in an area of interest according to one or more embodiments of the present disclosure.

FIG. 3 illustrates a computing device, as discussed in relation to FIG. 1, which can perform the method discussed in FIG. 2, for deploying a network of nodes in an area of interest according to one or more embodiments of the present disclosure. The computing device 346 can be, for example, a laptop computer, a desktop computer, a thermostat, or a mobile device (e.g., a mobile phone, a personal digital assistant, etc.), among other types of computing devices.

As shown in FIG. 3, computing device 346 (e.g., deployment device) includes a processor 348 and a memory 350 coupled to the processor 348. Memory 350 can be any type of storage medium that can be accessed by the processor 348 to perform various examples of the present disclosure. For example, memory 350 can be a non-transitory computer readable medium having computer readable instructions (e.g., computer program instructions) stored thereon that are executable by the processor 348 to deploy a network of nodes in an area of interest according to one or more embodiments of the present disclosure.

Memory 350 can be volatile or nonvolatile memory. Memory 350 can also be removable (e.g., portable) memory, or non-removable (e.g., internal) memory. For example, memory 350 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 350 is illustrated as being located in computing device 346, embodiments of the present disclosure are not so limited. For example, memory 350 can also be located internal to another computing resource (e.g., enabling computer readable instructions to be downloaded over the Internet or another wired or wireless connection).

Computing device 346 can include a user interface. The user interface can be a graphic user interface (GUI) that can provide (e.g., display and/or present) and/or receive information (e.g., data and/or images) to and/or from a user (e.g., operator) of computing device 346. For example, the user interface can include a screen that can provide information to a user of computing device 346 and/or receive information entered into a display on the screen by the user. However, embodiments of the present disclosure are not limited to a particular type of user interface.

Processor 348 can execute the executable instructions stored in memory 350 in accordance with one or more embodiments of the present disclosure. For example, processor 348 can execute the executable instructions stored in memory 350 to determine the area of interest for node deployment. For example, as discussed herein, coordinates of the area of interest can be entered into the computing device and a boundary of the area of interest can be created. Alternatively, and/or in addition, a blueprint of the area of interest can be used to determine the area of interest with the computing device. For instance, an image of the blueprint can be analyzed and a boundary of the area of interest can be determined.

In some embodiments, processor 348 can execute the executable instructions stored in memory 350 to create a bounding box for the area of interest. In an example, the bounding box can enclose the area of interest with a minimum area bounding box. For instance, a boundary of the bounding box can be configured such that an area enclosed by the bounding box is minimized. As such, the node deployment grid used to fill the bounding box may contain less nodes to fill the bounding box, resulting in less required nodes to provide coverage and connectivity, thus providing an increased efficiency associated with node usage.

In some embodiments, processor 348 can execute the executable instructions stored in memory 350 to decrease at least one of a horizontal and vertical distance between the number of nodes in the node deployment grid. As discussed herein, the distance between the number of nodes in the deployment grid can be decreased in a horizontal and/or vertical direction to reduce an amount by which nodes provide coverage to areas outside the area of interest. For example, the distance between the number of nodes can be decreased in a horizontal and vertical direction until coverage provided outside the area of interest by the nodes is minimized, but full coverage is still maintained with the area of interest.

In some embodiments, processor 348 can execute the executable instructions stored in memory 350 to determine whether the number of nodes in the node deployment grid include at least one of an essential node or an enhancement node based on a location of the number of nodes. As discussed herein, enhancement nodes can be located outside of the boundary of the area of interest and essential nodes can be located inside of the boundary of the area of interest. As such, the determination can be based on the location of the node.

In some embodiments, processor 348 can execute the executable instructions stored in memory 350 to remove the enhancement node when it provides duplicate coverage to a portion of the area of interest. In an example, the enhancement node can be removed when it provides duplicate coverage to any portion of the area of interest within range of the enhancement node.

In an example, the position of the enhancement node can be determined for providing the defined area of coverage when the enhancement node does not provide duplicate coverage to any portion of the area of interest within range of the enhancement node. For instance, if the enhancement node is the only node providing coverage to a portion of the area of interest, then the position of the enhancement node can be modified such that the enhancement node is located within a boundary of the area of interest. In an example, the defined area of coverage can be a maximum area of coverage provided by the enhancement node.

In some embodiments, processor 348 can execute the executable instructions stored in memory 350 to connect at least one of the essential node and the enhancement node to the number of nodes in the node deployment grid when at least one of the essential node and the enhancement node is disconnected from the number of nodes in the graph with a minimum spanning tree, as discussed herein. In an example, the minimum spanning tree can be used to compute weights of branches between nodes, which are represented as vertices on the minimum spanning tree. If a branch has a non-zero weight, an additional node can be placed along the branch to connect the two nodes associated with the branch. For instance, at least one of the essential node and the enhancement node can be connected to the number of nodes in the deployment grid by an additional node along the branch that has a minimum weight.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A system for deploying a network of nodes in an area of interest, the system comprising a processing resource in communication with a non-transitory computer-readable medium, wherein the computer-readable medium contains a set of instructions and wherein the processing resource is designed to execute the instructions to:
    determine the area of interest for node deployment;
    create a bounding box for the area of interest;
    fill the bounding box with a node deployment grid;
    determine whether a node in the node deployment grid is an essential node or an enhancement node, wherein the essential node is a node located within a boundary of the area of interest, and wherein the enhancement node is a node located outside the boundary of the area of interest and provides coverage to a portion of the area of interest;
    remove the enhancement node when it provides duplicate coverage to each portion of the area of interest that is provided coverage by the enhancement node; and
    connect at least one of the essential node and the enhancement node to a node in the node deployment grid when they are disconnected from nodes in the node deployment grid with a minimum spanning tree.

2. The system of claim 1, wherein the instructions executed to determine whether the node in the node deployment grid is the essential node or the enhancement node includes instructions executed to determine a location of the node.

3. The system of claim 2, wherein a search is performed for the enhancement node to determine whether a portion of the area of interest is provided coverage by only the enhancement node.

4. The system of claim 3, wherein a position of the enhancement node is determined for maximum coverage when the portion of the area of interest is provided coverage by only the enhancement node.

5. The system of claim 3, wherein at least one of a horizontal and vertical distance between a number of nodes in the node deployment grid is decreased.

6. The system of claim 1, wherein essential nodes are nodes that are located within a boundary of the area of interest.

7. The system of claim 1, wherein the deployment grid includes nodes placed on equally oriented row structures.

8. The system of claim 7, wherein the equally oriented row structures have nodes between the equally oriented row structures, wherein the nodes between the equally oriented row structures are connected by a z-connector axis.

9. The system of claim 1, wherein the deployment grid includes nodes placed on a shifted rectangular grid.

10. The system of claim 1, wherein:
    the minimum spanning tree is created, wherein the nodes are represented as vertices on the minimum spanning tree;
    a weight for each branch connecting each vertex is determined; and
    an additional node is placed along each branch with a minimum weight to ensure connectivity.

11. The system of claim 1, wherein a weight of 0 is assigned between branches of connected nodes.

12. A method for deploying a network of nodes in an area of interest, comprising:
    determining the area of interest for node deployment with an irregular boundary;
    creating a bounding box for the area of interest;
    filling the bounding box with a node deployment grid;
    determining whether a node in the node deployment grid is an essential node or an enhancement node based on a location of the node, wherein the essential node is a node located within a boundary of the area of interest, and wherein the enhancement node is a node located outside the boundary of the area of interest and provides coverage to a portion of the area of interest;
    removing the enhancement node when it provides duplicate coverage to each portion of the area of interest that is provided coverage by the enhancement node;
    determining a position of the enhancement node for providing a defined area of coverage when the enhancement node does not provide duplicate coverage to a portion of the area of interest; and
    connecting at least one of the essential node and the enhancement node to a node in the node deployment grid when they are disconnected from nodes in the node deployment grid with a minimum spanning tree.

13. The method of claim 12, wherein the method includes positioning the enhancement node inside of the area of interest to provide coverage to a portion of the area of interest.

14. The method of claim 12, wherein a weight of a branch that connects the at least one of the essential node and the enhancement node to the node in the node deployment grid has a minimum determined weight.

15. The method of claim 14, wherein the weight of the branch is calculated by calculating a division product that includes dividing the distance between the at least one of the essential node and the enhancement node by a range of each node and subtracting the division product by 1.

16. The method of claim 15, wherein the determined weight is zero when the distance between the at least one of the essential node and the enhancement is less than or equal to the range of each node.

17. A machine-readable non-transitory medium storing instructions for deploying a network of nodes in an area of interest, executable by a machine to cause the machine to:
    determine the area of interest for node deployment with an irregular boundary;
    create a bounding box for the area of interest;
    fill the bounding box with a node deployment grid that includes a number of nodes;
    decrease at least one of a horizontal and vertical distance between the number of nodes in the node deployment grid;
    determine whether the number of nodes in the node deployment grid include at least one of an essential node or an enhancement node based on a location of the number of nodes, wherein the essential node is a node located within a boundary of the area of interest, and wherein the enhancement node is a node located outside the boundary of the area of interest and provides coverage to a portion of the area of interest;

remove the enhancement node when it provides duplicate coverage to a portion of the area of interest;

determine a position of the enhancement node for providing a defined area of coverage when the enhancement node does not provide duplicate coverage to a portion of the area of interest; and connect at least one of the essential node and the enhancement node to the number of nodes in the node deployment grid when at least one of the essential node and the enhancement node is disconnected from the number of nodes in the graph with a minimum spanning tree.

18. The medium of claim 17, wherein instructions are executable by the machine to remove the enhancement node when it provides duplicate coverage to any portion of the area of interest within range of the enhancement node.

19. The medium of claim 17, wherein the bounding box encloses the area of interest with a minimum area bounding box.

20. The medium of claim 17, wherein the at least one of the essential node and the enhancement node is connected to the number of nodes in the deployment grid by an additional node along a branch that has a minimum weight.

\* \* \* \* \*